(12) United States Patent
Kotera et al.

(10) Patent No.: US 8,325,639 B2
(45) Date of Patent: Dec. 4, 2012

(54) IP TELEPHONE SYSTEM

(75) Inventors: Norio Kotera, Tokyo (JP); Jun Fujimoto, Tokyo (JP); Nobuyuki Nonaka, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1142 days.

(21) Appl. No.: 12/193,986

(22) Filed: Aug. 19, 2008

(65) Prior Publication Data

US 2009/0052436 A1 Feb. 26, 2009

(30) Foreign Application Priority Data

Aug. 21, 2007 (JP) ................................. 2007-215338
Aug. 21, 2007 (JP) ................................. 2007-215339
Aug. 21, 2007 (JP) ................................. 2007-215340

(51) Int. Cl.
*G08C 17/00* (2006.01)
*H04J 3/18* (2006.01)

(52) U.S. Cl. ..................... 370/311; 370/477; 455/67.11; 455/574; 455/226.1

(58) Field of Classification Search ........................ None
See application file for complete search history.

(56) References Cited

U.S. PATENT DOCUMENTS

| 6,445,697 B1* | 9/2002 | Fenton | 370/357 |
| 2004/0254796 A1* | 12/2004 | Lehtimaki | 704/500 |
| 2005/0237952 A1* | 10/2005 | Punj et al. | 370/260 |
| 2008/0159264 A1* | 7/2008 | Fleming | 370/352 |
| 2008/0186872 A1* | 8/2008 | Zaencker | 370/252 |

FOREIGN PATENT DOCUMENTS

JP 2005-045737 2/2005

* cited by examiner

*Primary Examiner* — Yemane Mesfin
*Assistant Examiner* — Christine Duong
(74) *Attorney, Agent, or Firm* — KMF Patent Services, PLLC; Kenneth M. Fagin, Esq.

(57) ABSTRACT

An IP telephone system according to the present invention includes a plurality of communication devices T1, T2 allowed to mutually communicate through a network (IP network); a server for executing a connection starting process of communication between the communication devices, as well as for controlling communication data transmitted and received between the server and the communication devices during the communication between the communication devices; and a data transmission and reception controller for mutually switching, upon input of a predetermined command, a communication mode between a standard communication mode and a power-saving communication mode in a condition that communication connection is established between the communication devices upon execution of the connection starting process. The sound data is transmitted and received between the communication devices and the server in the standard communication mode. Transmission and reception between the communication devices and the server is stopped with respect to the sound data below a predetermined level while being continued with respect to the sound data beyond the predetermined level received in the power saving communication mode.

3 Claims, 6 Drawing Sheets

IP TELEPHONE SYSTEM

CROSS-REFERENCE TO RELATED APPLICATIONS

This application claims priorities of Japanese Patent Application Nos. 2007-215338, 2007-215339, and 2007-215340 filed on Aug. 21, 2007. The contents of these applications are incorporated herein by reference in their entirety.

BACKGROUND OF THE INVENTION

1. Field of the Invention

The present invention relates to an IP telephone system which achieves low power consumption of communication devices in the field of communication technology with the use of an IP (Internet Protocol) network.

1. Description of the Related Art

Conventionally, there are known technologies of communicating various types of sound data such as music, for example, BGM, peoples' voice, and the like, through the IP (Internet Protocol) networks such as the Internet and intranets. Japanese Patent Application Laid-Open Publication No. 2005-45737 discloses an example of communication technology of this type. Such a sound communication technology has been in practical use, in the form of communication devices (so-called IP telephones) with the use of VoIP (Voice over Internet Protocol), for example.

As one example of the above practical use, mutual communication between IP telephones (communication devices) will be described below. Analog sound data is digitally converted at a transmission source, and the digital data is frame-processed and divided into smaller units. Header information of a transmission destination is added for each of the divided sound data, whereby the sound data is transmitted (wirelessly communicated) in the form of divided smaller units referred to as RTP (Real-Time Transport Protocol) in sequential order to the destination through the IP network. After that, at the transmission destination, each of the received packets is restored to the original sound data, and the restored sound data is reproduced, whereby communication is conducted between the transmission source and the transmission destination.

In the sound communication technology using the IP telephones (communication devices), the IP network in which these IP telephones are connected to a wireless LAN is constructed, thereby achieving sound communication at comparatively low cost regardless of a distance or communication time between the transmission source and the transmission destination. This sound communication technology is available for use as a collaboration tool by combining the IP telephones with soft phones such as Skype or other fixed-line phones.

However, the current IP telephones (communication devices) entails a problem that they cannot be continuously used over a long time. This is because communication (telephone conversation) between the IP phones requires a process that consumes a large amount of power, thereby using up a battery capacity quickly. Here, in consideration of power consumption of the IP telephone, a large amount of battery power is consumed through each of processes of (1) digitizing the sound data, (2) restoring and reproducing the sound data from the packet forms, and (3) conducting wireless packet communication with the IP network, for example.

In view of the above-described circumference, it is an object of the present invention to provide an IP telephone system that enables communication devices to be continuously used over a long time by reducing power consumption.

SUMMARY OF THE INVENTION

A first aspect of the present invention is an IP telephone system including (i) a plurality of communication devices allowed to mutually communicate through a network; (ii) a server for executing a connection starting process of communication between the communication devices, as well as for controlling sound data transmitted and received between the server and the communication devices during the communication between the communication devices; and (iii) a data transmission and reception controller for mutually switching, upon input of a predetermined command, communication mode between a standard communication mode and a power-saving communication mode in a condition that communication connection is established between the communication devices upon execution of the connection starting process. The sound data is transmitted and received between the communication devices and the server in the standard communication mode. Transmission and reception between the communication devices and the server is stopped with respect to the sound data below a predetermined level while being continued with respect to the sound data beyond the predetermined level in the power saving communication mode.

According to the first aspect of the present invention, the switching control is exercised, upon input of the predetermined command, to switch the mode between the standard communication mode and the power-saving communication mode. In this manner, for example, the process that consumes the large amount of power can be reduced, thereby reducing the battery power consumption of the communication devices. As a result, the communication device can be continuously used over a long time.

A second aspect of the present invention is an IP telephone system constituted as set forth below. In the first aspect, each of the communication devices is provided with a data transmission and reception controlling unit as the data transmission and reception controller, which stops transmission of the sound data below the predetermined level to the server while continuing the transmission of the sound data beyond the predetermined level, upon input of a command for switching the communication mode. The server is further provided with a data transmission and reception controlling function as the data transmission and reception controller, which stops transmission of the sound data below the predetermined level to the communication devices while continuing the transmission of the sound data beyond the predetermined level, upon input of a reporting command for reporting a status that the communication mode of the communication devices is to be switched.

According to the second aspect of the present invention, not only the transmission process of transmitting the sound data from the communication devices to the server but also the reception process of receiving the sound data from the server to the communication devices can be reduced, thereby achieving lower power consumption of the communication device.

A third aspect of the present invention is an IP telephone system constituted as set forth below. In the second aspect, the sound data is transmitted and received between the communication devices and the server based on an RTP. The reporting command is transmitted as an extension event of an RTCP from the communication devices to the server.

According to a third aspect of the present invention, the communication mode can be easily switched without any effect of a regular data stream (that is, a process sequence of sound data).

A fourth aspect of the present invention is an IP telephone system including (i) a plurality of communication terminals allowed to mutually communicate through a network; (ii) a server for executing a connection starting process of communication between the communication terminals, as well as for controlling communication data transmitted and received between the server and the communication terminals based on an RTP during the communication between the communication terminals; and (iii) a data transmission and reception controller for mutually switching, upon input of a predetermined command, transmission mode between a transmission interrupting mode and a transmission resuming mode in a condition that communication connection is established between the communication terminals upon execution of the connection starting process and the communication data in a form of RTP packets is transmitted and received between the communication terminals and the server. Transmission of the communication data is interrupted in the transmission interrupting mode. The transmission of the communication data is resumed in the transmission resuming mode.

According to the fourth aspect of the present invention, the switching control is exercised, upon input of the predetermined command, to switch the mode between the transmission interrupting mode and the transmission resuming mode. In this manner, for example, the process that consumes the large amount of power can be reduced, thereby reducing the battery power consumption of the communication terminal. As a result, the communication terminal can be continuously used over a long time.

A fifth aspect of the present invention is an IP telephone system constituted as set forth below. In the fourth aspect, each of the communication terminals is provided with a data transmission and reception controlling unit as the data transmission and reception controller, which mutually switches the transmission mode of the server between the transmission interrupting mode and the transmission resuming mode with respect to the communication data, upon input of a command for switching the transmission mode. The server is further provided with a data transmission and reception controlling function as the data transmission and reception controller, which mutually switches the transmission mode of the communication terminals between the transmission interrupting mode and the transmission resuming mode with respect to the communication data, upon input of a reporting command for reporting a status that the communication mode of the communication terminals has been switched.

According to the fifth aspect of the present invention, not only the transmission process of transmitting the communication data from the communication terminals to the server but also the reception process of receiving the communication data from the server to the communication terminals can be reduced, thereby achieving lower power consumption of the communication device.

A sixth aspect of the present invention is an IP telephone system constituted as set forth below. In the fifth aspect, the reporting command is transmitted as an extension event of an RTCP from the communication terminals to the server.

According to the sixth aspect of the present invention, the mode can be easily switched between the transmission interrupting mode and the transmission resuming mode without any effect of a regular data stream (that is, a process sequence of sound data).

A seventh aspect of the present invention is an IP telephone system including (i) a plurality of communication terminals allowed to mutually communicate through a network; (ii) a server for executing a connection starting process of communication between the communication terminals, as well as for controlling communication data transmitted and received between the server and the communication terminals based on an RTP during the communication between the communication terminals; and (iii) a session controller for executing an established-session controlling process between the server and the communication terminal and for mutually switching, upon input of a predetermined command, a mode between a hold mode and a hold canceling mode, in a condition that a session allowing the communication terminals to mutually communicate is established upon execution of the connection starting process and the communication data in a form of RTP packets is transmitted and received between the communication terminals and the server. The session is temporarily interrupted in the hold mode. The session having been interrupted is resumed by canceling the hold mode.

According to the seventh aspect of the present invention, the switching control is exercised, upon input of the predetermined command, to switch the mode between the hold mode and the hold canceling mode. In this manner, for example, the process that consumes the large amount of power can be reduced, thereby reducing the battery power consumption of the communication terminal. As a result, the communication terminal can be continuously used over a long time.

An eighth aspect of the present invention is an IP telephone system constituted as set forth below. In the seventh aspect, each of the communication terminals is provided with a session controlling unit as the session controller, which requests the server to mutually switch the operation mode between the hold mode and the hold canceling mode, upon input of a command for switching the mode. The server is additionally provided with a session controlling function as the session controller, which executes the established-session controlling process to mutually switch the operation mode between the hold mode and the hold canceling mode, upon input of a reporting command for requesting the server to switch the operation mode, from the communication terminals.

According to the eighth aspect of the present invention, not only the transmission process of transmitting the communication data from the communication terminals to the server but also the reception process of receiving the communication data from the server to the communication terminals can be reduced, thereby achieving lower power consumption of the communication device. Furthermore, hold operation and hold canceling operation can be performed from the server side, so that the session between the communication terminals outside a communication area can be prevented from going out of control while the hold canceling operation can be performed to various types of communication terminals not provided with the session controlling unit.

A ninth aspect of the present invention is an IP telephone system constituted as set forth below. In the eighth aspect, the reporting command is transmitted as an extension event of an RTCP from the communication terminals to the server.

According to the ninth aspect of the present invention, the mode can be easily switched between the hold mode and the hold canceling mode without any effect of a regular data stream (that is, a process sequence of sound data).

The present invention provides an IP telephone system which achieves lower power consumption of the communication terminal, thereby enabling its continuous use over a long time.

DESCRIPTION OF THE PREFERRED EMBODIMENTS

Hereinafter, an IP telephone system according to embodiments of the present invention will be described with reference to the drawings.

First Embodiment

First, an IP telephone system according to a first embodiment will be described. The IP telephone system according to this embodiment is configured as a communication system to interconnect communication terminals to a server through an IP network. Herein, the communication terminals utilize communication technologies of the Internet. The server functions to allow communication (wireless communication) among the communication terminals in accordance with a predetermined communication protocol. It should be noted that the IP network is a generic name for the Internet or is a network having the same structure as that of the Internet, and the communication terminal can be connected to a wireless LAN (Local Area Network) or a wired LAN constructed in the IP network.

The server functions to follow a call setup of the communication terminals based on a communication system such as an SIP (Session Initiation Protocol) or a P2P (Peer to Peer). In this case, a communication device or a data communication device can be employed as a communication terminal, the communication device such as an IP telephone, an intercom functioning as the IP telephone, a (desktop or laptop) dpersonal computer H (see FIG. 1A) installed with predetermined application software programs, functioning as a soft phone, or PDA (Personal Digital Assistants)

Figure 1A:
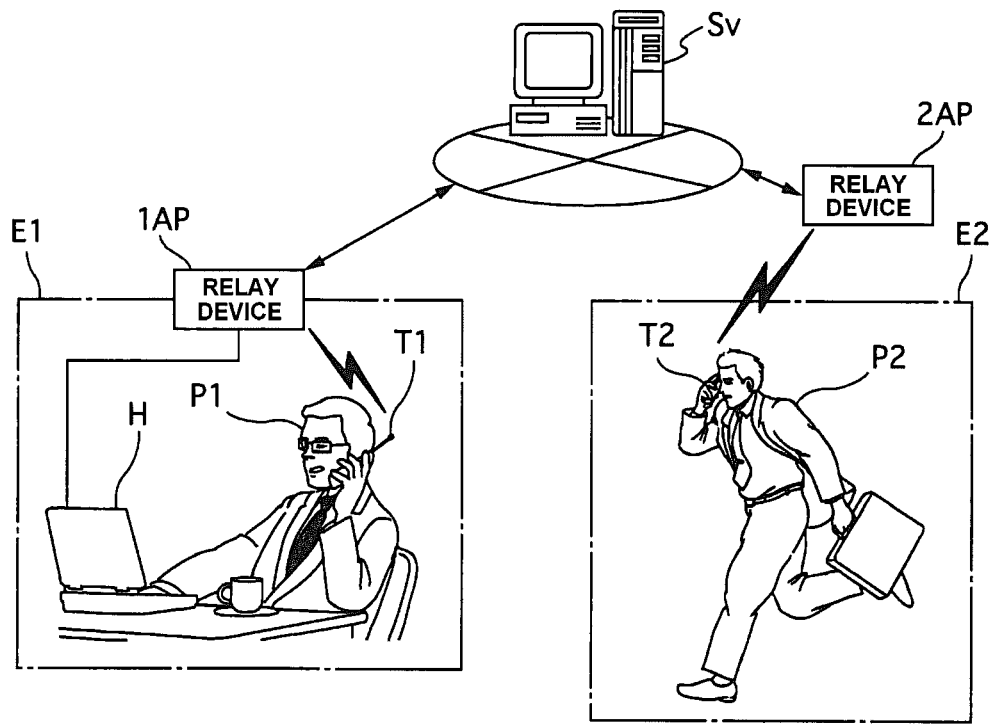
FIG. 1A is a schematic view showing an exemplary configuration of an entire IP telephone system according to a first embodiment of the present invention, in a state where communication is conducted between communication devices.
Figure 1B:
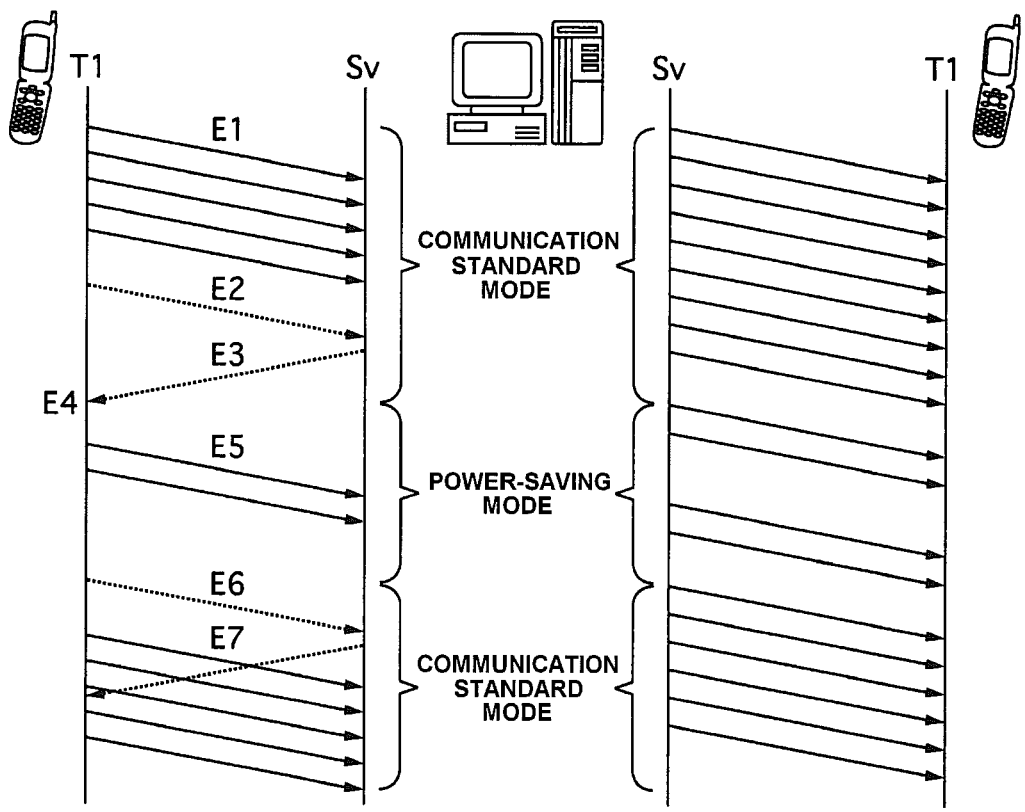
FIG. 1B is a view showing a control process sequence of mode-switching of the IP telephone system between a hold mode and a hold canceling mode, according to the first embodiment of the present invention.

FIGS. 1A and 1B show an exemplary configuration of the aforementioned IP telephone system composed of communication terminals (communication devices such as a wireless IP telephone terminal) T1, T2; a plurality of (two as one example in the drawing) relay devices (such as an access point) 1AP, 2AP; and the server Sv. In this configuration, the communication terminals are carried by a plurality of (two in the figures) users P1, P2. The relay devices connect the communication devices T1, T2 to the IP network (not shown) by conducting a wireless communication with each of the communication devices T1, T2 while relaying data transmitted and received between the communication devices T1, T2 and a server Sv. The server Sv is connected to each of the relay devices 1AP, 2AP through the IP network.

The relay devices 1AP, 2AP function to relay data in the course of communication between the communication devices T1, T2, depending on a traffic status of the IP network, thereby making it possible to prevent traffic concentration on the server Sv or the IP network during the communication as well as to distribute a load on the server Sv or the IP network. At this point, in order to relay the data in a similar fashion, this system may be configured so that a data-relay server (load-distribution server), although not shown, is separately provided to assign the aforementioned data-relaying function thereto, not to the relay device 1AP, 2AP. Alternatively, the server Sv may be further provided with the data-relaying function.

Herein, in order to ensure its mobility, each of the communication devices T1, T2 is set so as to repeatedly register a position of its terminal by wirelessly communicating with each of the relay devices 1AP, 2AP at regular time intervals (for example, once every few seconds or once a minute). During the wireless communication between the communication devices T1, T2 and the relay devices 1AP, 2AP, various types of signals are transmitted and received in compliance with the wireless-communication standard such as IEEE802.11a, IEEE802.11b, or IEEE802.11g. At this time, upon receipt of a wireless signal from each of the communication device T1, T2, each of the relay devices 1AP, 2AP measures a radio field intensity, thereby notifying the measured result through the relay devices to the server Sv.

Figure 2:
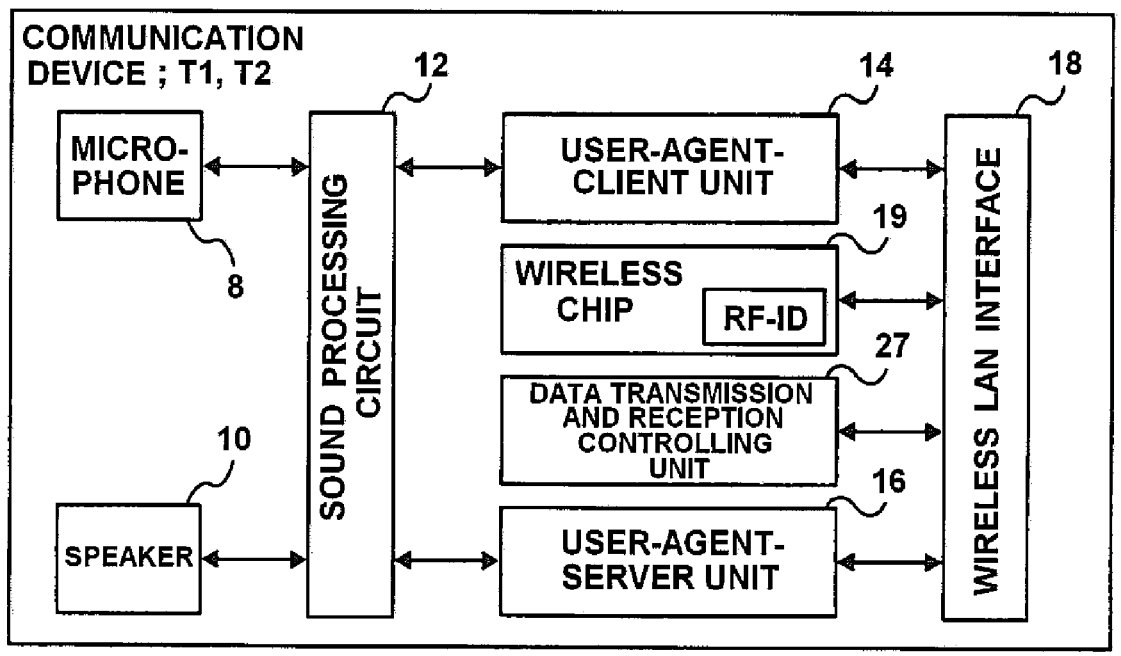
FIG. 2 is a view showing a configuration of the communication device (communication terminal)

FIG. 2 shows an exemplary internal configuration of each of the communication devices T1, T2. Each of the communication devices T1, T2 includes a microphone 8 for converting sound into an electrical signal; a speaker 10 for converting the electrical signal into sound; a sound processing circuit for converting an analog signal output from the microphone 8 into a digital signal as well as converting the digital signal into the analog signal by which the speaker 10 is driven; a user-agent-client unit 14 for generating and transmitting an SIP request and receiving a reply; a user-agent-server unit 16 for receiving and processing the SIP request and generating the reply; a wireless LAN interface 18 for conducting a wireless communication with each of the relay devices 1AP, 2AP to transmit and receive various types of data; and a wireless chip 19 having RF-ID.

In this case, the communication device T1, T2 can (wirelessly) communicate with each other through the relay devices 1AP, 2AP located inside a communication area E1, E2 (shown in FIG. 1A), and the server Sv functioning as an SIP server. The communication devices T1, T2 also function as terminals of an extension telephone to allow the users P1, P2 to communicate with each other. Furthermore, addition of the function as the SIP phone to the communication devices T1, T2 allows one-to-one communication (such as broadcasting from a manger to all users), one-to-multiple communication (such as a multipoint meeting with the participation of all users), and the like. Yet further, connection of the server Sv functioning as the SIP server to a server (not shown) (located on a different floor within the same building or in a remotely-situated branch office) allows mutual communication between devices located in a plurality of communication areas.

Figure 3:
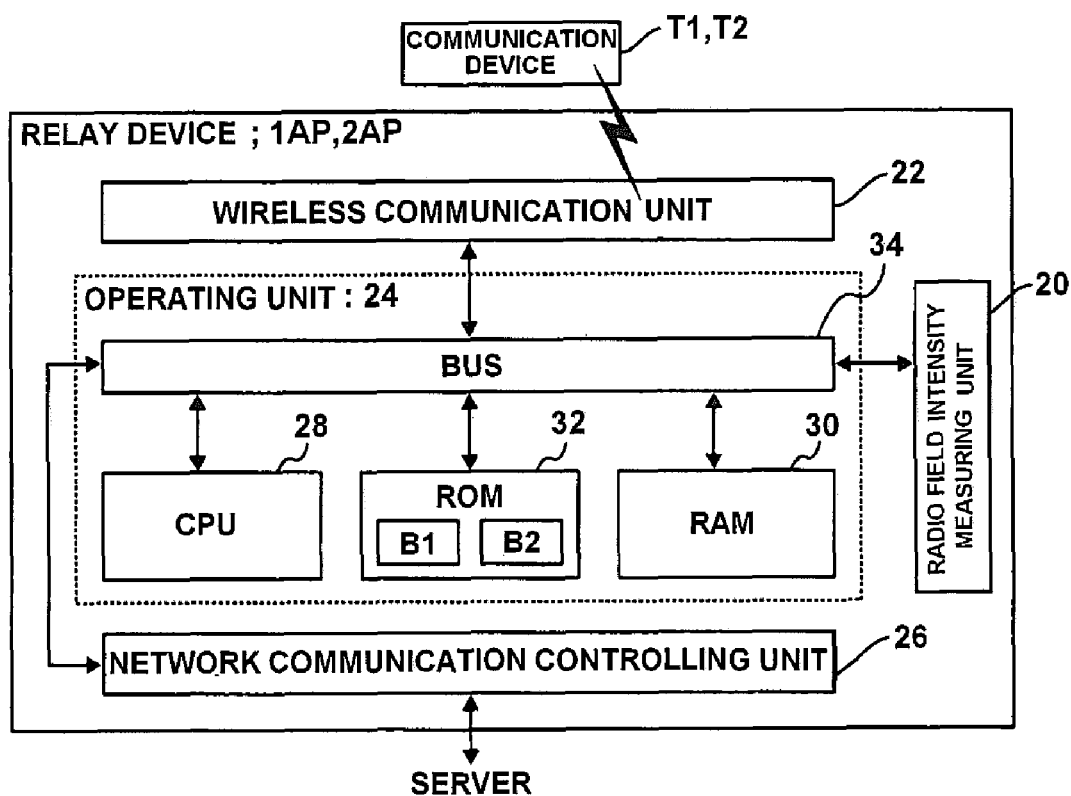
FIG. 3 is a view showing a configuration of a relay device.

FIG. 3 shows an exemplary internal configuration of each of the relay devices. Each of the relay devices 1AP, 2AP functions to relay radio waves to connect to the server Sv, the communication devices T1, T2 as wireless LAN terminals (wireless IP telephone terminals) as described above. Within the communication area in which the relay devices 1AP, 2AP can communicate, mutual connection between the communication devices T1, T2 and between the communication devices T1, T2 and the server Sv can be established through the communication system (network) according to this embodiment, in the above-described manner.

As shown in FIG. 3, each of the relay devices 1AP, 2AP includes a radio field intensity measuring unit 20, a wireless communication unit 22 for conducting wireless communication with each of the communication devices T1, T2, an operating unit 24 connected to the wireless communication unit 22, and a network communication controlling unit 26 connected to the operating unit 24. The radio field intensity measuring unit 20 automatically measures the intensity of the radio wave received from a wireless chip 19 having the RF-ID, the wireless chip being provided in each of the communication devices T1, T2; retrieves and stores the measured result as a radio field intensity measured data corresponding to information indicative of a status of each of the communication devices T1, T2; and transmits the stored radio field intensity measured data to the server Sv. Herein, the wireless communication unit 22 is configured as, for example, an RF (Radio Frequency) unit having the modulating and demodulating function for data transmission and reception (wireless communication) with each of the communication devices T1, T2 as well as the function of transmitting and receiving (wirelessly communicating) the data in compliance with a predetermined protocol.

The operating unit 24 has a function that the CPU 28 executes, using a ROM 30 as a work area, a predetermined process in accordance with a program stored in a ROM 32. The ROM 32 is provided with banks B1, B2, for example, so that at least one of the banks, for example, B1, stores a program which is caused to function as the relay devices 1AP, 2AP. The program data is exchanged among the CPU 28, the RAM 30, and the ROM 32, through the bus 34. The bus 34 is connected to the server Sv through the network communication controlling unit 26. In this case, the CPU 28 executes the program stored in the bank B1 of the ROM 32, using the RAM 30 as a work area, thereby achieving the function of the relay devices 1AP, 2AP. Furthermore, the CPU 28 may operate by switching the bank B1 to the reserve bank B2 so as not to stop communication if the bank B1 has failed or if the program has been updated.

The server Sv is an SIP entity functioning as an SIP server (function of processing an SIP request). This server also functions not only as a user agent server but also as a user agent client. The user agent server includes: a proxy server that determines a next forwarding destination of the SIP request from each of the communication devices T1, T2 operating as a user agent and forwards the request; a redirect server that determines a next forwarding destination of the SIP request and transmits a reply of the request; and a server that receives a REGISTER request and registers a contact address of each of the communication devices T1, T2 as the user agent.

Figure 4:
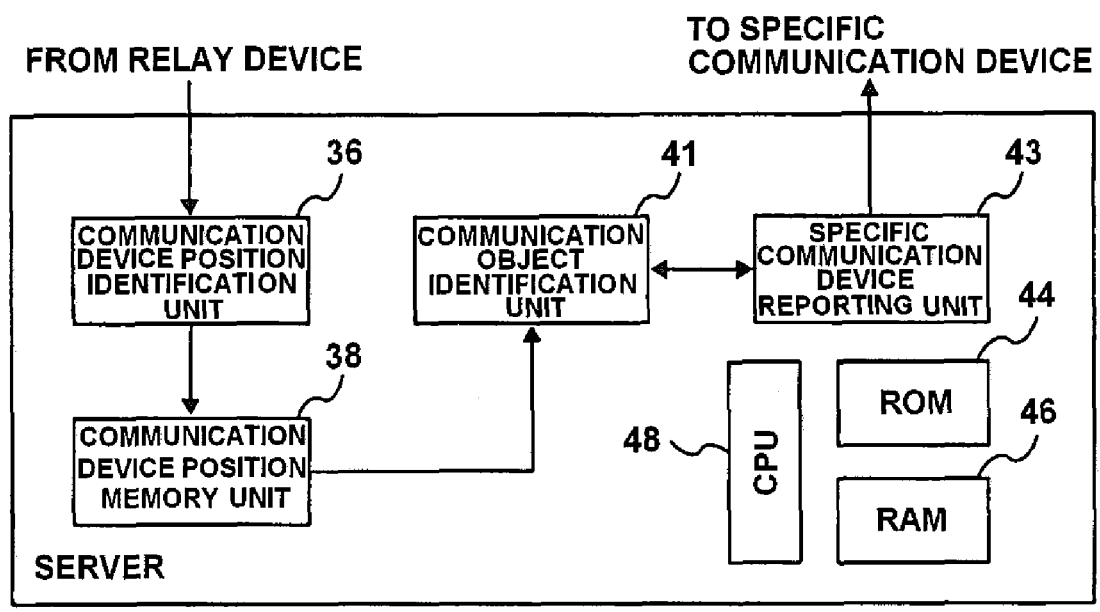
FIG. 4 is a view showing a configuration of a server.

FIG. 4 shows an exemplary internal configuration of the server Sv. This server SV includes a communication device position identification unit 36, communication device position memory unit 38, a communication object identification unit 41, and a specific communication device reporting unit 43. This server Sv that is configured as an information processor such as a personal computer or a workstation stores a memory in the ROM 44 as an internal memory of the server Sv and executes the memory by the CPU 48 using the RAM 46 as a work area, the program for executing various types of functions to be described hereinafter. In this case, the program is not necessarily stored in the ROM 44 and may be provided by an external device such as an ASP (Application Service Provider), for example.

The communication device position identification unit 36 locates the communication devices T1, T2 based on the radio field intensity measured data received through the relay devices 1AP, 2AP from the communication devices T1, T2. Positions of the communication devices T1, T2 are changed as the users P1, P2 (see FIG. 1A) travels, who carry the communication devices T1, T2, respectively. Thus, the communication device position identification unit 36 updates the positions of the communication devices T1, T2 every time of receipt of the radio field intensity measured data.

The positions of the communication devices T1, T2 are not always needed to be converged in a manner of a coordinate. For example, the communication areas E1, E2 of the relay devices 1AP, 2AP may be divided into plural smaller areas, and the positions of the communication areas T1, T2 may be identified based on the corresponding smaller areas. Furthermore, in consideration of the communication traffic, this system may be configured so that the relay devices 1AP, 2AP transmits the measured data to the server Sv only if a change occurs in the radio field intensity measured data measured by the relay devices 1AP, 2AP, and the server Sv locates and uploads the positions of the communication devices T1, T2 at the above transmission timing.

The communication device position memory unit 38 stores the positions of the communication devices T1, T2, which are located by the communication device position identification unit 36. The communication device position memory unit 38 also stores the positions of the communication devices T1, T2, which are updated every time of receipt of the radio field intensity measured data.

When the user (P1, for example) at a caller side operates the communication device T1 that he or she carries and the communication device T1 transmits a ring signal to call up the communication device T2 that the user at a called side carries, the communication object identification unit 41 retrieves information on the communication device T2 (paging communication device) corresponding to the ring signal, thereby identifying the position of the communication device T2 stored in the communication device position memory unit 38.

Based on the positional information on the communication device (paging communication device T2) identified by the communication object identification unit 41, the specific communication device reporting unit 43 calls up the communication device T2. In this manner, a connection starting process is executed to try communication connection between the communication device T1 at the caller side and the communication device T2 at the called side. As one example, let us consider a case in which the specific communication device reporting unit 43 is provided with a function as a caller terminal (of the IP phone) (as the user agent client) to implement a session management between the specific communication device reporting unit 43 and each of the communication devices T1, T2. In this case, address information (such as a URI (Uniform Resource Identifier) and telephone number) of the communication devices T1, T2 is previously recorded in the specific communication device reporting unit 43, thereby implementing an establishment process of the session (RTP (Real Time Transport Protocol)/RTCP (Real time Transport Control Protocol) session) based on the corresponding address information.

In the connection starting process, a transmission and reception process (signaling process) of the SIP request is executed through the server Sv in compliance with the predetermined protocol. Specifically, when transmitting "INVITE" to the called side (communication device T2) and subsequently receiving "100 Trying (provisional reply)", "180 Ringing (paging)", "200 ok (successful reply)" from the called side, the caller side (communication device T1) transmits "ACK (acknowledge reply)" to the called side. In this manner, a communication connection (session) is established between the caller side (communication device T1) and the called side (communication device T2).

Upon establishment of the session, the communication device T1 at the caller side is controlled in a state in which the communication with the communication device T2 at the called side can be started, and thereafter, the communication from the caller side to the called side can be conducted by performing a predetermined communication operation (such as operation using communication buttons). At the time of the communication between the communication devices T1, T2, voice packets (RTP packets) that the sound data is packetized based on the RTP/RTCP are transmitted and received while control packets (RTCP packets) for controlling the transmission and reception of the voice packets (RTP packets) are transmitted and received as required.

The RTP is a protocol for transmitting and receiving the sound data (or video data) itself while the RTCP is a protocol for evaluating a line quality, such as a packet loss, a delay jitter, or a round-trip delay, as well as transmitting and receiving information for implementing real-time communication suitable for the band. Therefore, the RTC packets are transmitted and received, thereby making it possible to presume the statuses of a network and communication devices T1, T2 in accordance with the information returned from the other side of communication and to execute a dynamic process, for example, a communication condition change between the communication devices T1, T2 (such as reduced number of times of communication).

Hereinafter, a description will be given with respect to the RTP/RTCP packet that is transmitted and received between the communication devices T1, T2 after establishment of the RTP/RTCP session subsequent to execution of the connection starting process. The RTP packet is composed of a UDP (User Datagram Protocol) header, an RTP header, and an RTP data. In this case, at the RTP header, there are sequentially provided: a version information storing unit (V: version, for example, V=2); a padding storing unit (P: padding); an extension bit storing unit (X: extension); a CSRC (contributing source) count storing unit (CC); a marker information (M: marker) storing unit; a marker bit storing unit (M: marker); a payload type information storing unit (PT: payload type); a sequence number information storing unit (sequence number); a time stamp storing unit (time stamp); an SSRC identifier storing unit (synchronization source identifier); and an CSRC identifier storing unit. The sound data that is actually exchanged between the communication devices T1, T2, specifically between the users P1, P2, is additionally provided behind the CSRC identifier storing unit (when using the extension bit (if 1 is set in the extension bit storing unit)).

On the other hand, the RTCP packet is composed of an IP header; a UDP header; an RTCP header; and a RTCP data. In this case, the header of an RTCP APP packet as the extensible RTCP packet is sequentially composed of: a version information storing unit (V: version, for example, V=2); a padding presence or absence storing unit (P: padding); a subtype storing unit (so-called item count storing unit (IC: Item Count)); a packet type (PT: packet type) storing unit; a report length storing unit (length); an SSRC/CSRC identifier unit; and a Name storing unit that is described based on ASCII (American Standard Code for Information). The data storing unit (Application-Dependent Data) storing data unique to the application is assigned behind the Name storing unit.

A type of the RTCP packet is recorded in the packet type PT storing unit. In this embodiment, as one example, 204 (packet type value) is set to a packet type (PT). The packet type value of 204 indicates that the RTCP packet is the APP (Application defined information), that is, the RTC packet is a packet for reporting control information unique for an application against the RTCP protocol.

Apart from the APP packet (with the packet type value of 204) as described above, the RTCP packet includes an RTCP SR (Sender Report) packet (with the packet type value of 200) as a type that is transmitted by a transmitter of the RTP data and an RTCP RR (Receiver Report) packet (with the packet type value of 201) that is transmitted by a receiver of the RTP data.

The SR packet is transmitted from a communication device that sends a stream to other communication devices, and includes sender information and a reception report block. The sender information is relevant to a stream that the communication device sends while the reception report block is to report a reception condition (such as a rate of packet destruction and jitter) of each of received streams to a communication device at a transmitting side. On the other hand, the RR packet is to report information relevant to the stream received from other communication device, and also, includes a report block for reporting a reception condition of each of received streams to a communication device at a receiving side.

Set in this report block are a synchronization source (SSRC: Synchronization Source) identifier of the packet transmitter; a loss ratio of RTP; the number of lost RTP packets; a receiving sequence number; an average value of jitter at an arrival time interval; transmission time of the lastly received SR (LSR: Last SR timestamp); time interval from a time when the SR is lastly received to a time when this PR is transmitted (DLSR:: Delay since Last SR).

Therefore, the communication device (T1, for example) at the transmitter side controls the number of RTP packets to be transmitted and the number of RTP bytes to be transmitted at the time of transmitting the RTP data. On the other hand, the communication device (T2, for example) at the receiver side controls, when receiving the RTP data, management information such as the number of RTP packets to be received, the number of lost RTP packets, and a jitter at the arrival time. Accordingly, the communication devices T1, T2 can mutually keep track of the communication status.

Features of the IP telephone system according to the first embodiment will be described next. As shown in FIGS. 1A and 1B, during communication between the communication devices T1, T2 in the IP telephone system according to the first embodiment, the sound data is transmitted and received between the communication devices T1, T2 and the server Sv by arbitrarily switching two communication modes (a standard communication mode and a power-saving communication mode). That is, the IP telephone system according to this embodiment includes a data transmission and reception controlling unit. The data transmission and reception controlling unit mutually mode-switches between the standard communication mode and the power-saving communication mode upon input of a predetermined command in a condition that communication connection is established between the communication devices T1, T2 upon execution of the connection starting process. Between the communication devices T1, T2 and the server Sv, all sound data is transmitted and received in the standard communication mode. Further, transmission and reception are stopped with respect to the sound data below a predetermined level while being continued with respect to the sound data beyond a predetermined level in the power-saving communication mode.

In this case, as shown in FIG. 2, each of the communication devices T1, T2 is provided with a data transmission and reception controlling unit 27 as the data transmission and reception controlling unit. Upon input of a communication mode switching command, specifically, a command for mode-switching from the standard communication mode to the power-saving communication mode, the data controlling unit 27 stops transmission of the sound data below the predetermined level to the server Sv while continuing transmission of the sound data beyond the predetermined level. On the other hand, upon input of a command for switching a mode from the power-saving communication mode to the standard communication mode, the data controlling unit 27 resumes transmission of the sound data below a predetermined level in a manner such that the above data is transmitted together with the sound data beyond the predetermined level.

The server Sv is additionally provided with a data transmission and reception controlling function as the data transmission and reception controller. This function is intended to stop transmission of the sound data below the predetermined level to the communication devices T1, T2 while continuing transmission of the sound data beyond the predetermined level upon input from the communication devices T1, T2 of a reporting command reporting a status that the communication mode is switched, specifically, from the standard communication mode to the power-saving communication mode. On the other hand, the data transmission and reception controlling function allows the server Sv to resume transmission of the sound data below the predetermined level to the communication devices T1, T2 in a manner such that the above data is transmitted together with the sound data beyond the predetermined level.

A level of sound data as a criterion for determining whether transmission is stopped or not is arbitrarily set for the communication devices T1, T2 and the server Sv when setting the power-saving communication mode, based on whether or not meaningful sound has been input or not, the sound has about the same level of sound intensity (decibel value), volume, frequency, or the like, as that of a daily conversation or not, or whether the sound meets these conditions or not. Therefore, the level is not particularly limited herein.

Next, an operational example of the IP telephone system to switch a communication mode according to the first embodiment will be described with reference to FIG. 1B. This operational example is explained on the assumption that control is exercised between the communication device T1 and the server Sv to switch the communication mode. This control is exercised in a condition that the communication device T1 is set as the caller side while the communication device T2 is set as the called side when the communication connection (the RTP/RTCP session) has already been established upon execution of the connection starting process between the communication devices T1, T2.

After execution of the connection starting process, the communication device T1 adds (stores) the sound data to the RTP packets, thereby transmitting the data to the communication device T2 as the other side of communication (the called side) through the server Sv (E1). The sound data includes the sound data below the predetermined level, such as voiceless data generated between conversations or noise data generated around the user (hereinafter, referred to as voiceless data), other than the sound data beyond the predetermined level (hereinafter, referred to as voice data) exchanged during a daily convention.

Even where the voiceless data is not transmitted to the other side of communication (the communication device T2), the communication between both sides of communication (P1 and P2) can be continued without particularly affecting communication (telephone conversation) therebetween. On the other hand, the voiceless data, which is digitized in a sound processing circuit 12, is added to the RTP packets, and then, the digitized data is transmitted to the server Sv in the form of packets, resulting in wasteful battery power consumption of the communication device T1.

In the circumstances as described above, this embodiment of the present invention reduces battery power consumption to achieve lower power consumption of the communication device T1 by stopping the communication device T1's transmission of the voiceless data in the form of packets as described above, that is, by switching a mode of the communication device T1 from the standard communication mode to the power-saving communication mode. In this case, the data transmission and reception controlling unit 27 constantly monitors the remaining amount of battery power. In the case where the remaining amount decreases below a predetermined level, the communication device T1 automatically generates and executes a command (mode switching command) for switching the communication mode from the standard communication mode to the power-saving communication mode, thereby stopping transmission of the voiceless data in the form of packets to the server Sv.

Timing for generating the mode switching command may be fixedly preset based on a proportion of the remaining amount to a full charge, or may be set by being arbitrarily changed (step by step) in accordance with communication time or the battery remaining amount at the time. The data transmission and reception controlling unit 27 may passively generate and execute the mode switching command, based on explicit operation performed by the user P1 (such as operation of pushing a mode switching button or utterance of keywords (meaningful words), instead of or in addition to the structure that the data transmission and reception controlling unit 27 automatically generates and executes the mode switching command by constantly monitoring the battery remaining amount. With the structure as described above, the user P1 can view an indicator of the battery remaining amount displayed on a monitor (not particularly assigned by reference numerals) of the communication device T1, thereby allowing the user to switch the communication mode from the standard communication mode to the power-saving communication mode by generating and executing the mode switching command after previously allowing the communication time not only when the remaining amount decreases but also when the remaining amount is left enough.

In the case of switching the communication mode of the communication device T1 from the standard communication mode to the power-saving communication mode as described above, the communication device T1 transfers the RTCP packets to the server Sv through the wireless LAN interface 18 prior to the above mode switching (E2). The RTCP packets are intended to report the status the data transmission and reception controlling unit 27 switches the communication mode. At that time, the data transmission and reception controlling unit 27 sets the packet type value to 204 as an extension event of the RTCP while generating the RTCP packets (APP packets) storing in the data storing units thereof, the data for reporting the mode switching from the standard communication mode to the power-saving communication mode.

Having thus received from the communication device T1, the RTCP packets for reporting the communication mode switching, the server Sv transmits the RTCP packets to the communication device T1 in the case of switching the communication mode of the communication device T1 to the power-saving communication mode (E3). The RTCP packets are intended to report the status that the sound data to be transmitted from the server Sv to the communication device T1 is limited to the data (voice data) beyond the predetermined level and that the communication mode is switched to the power-saving communication mode in which transmission of the sound data (voiceless data) below the predetermined level is stopped.

At that time, the server Sv sets the packet type value to 204 as an extension event of the RTCP while generating the RTCP packets (APP packets) having stored in the data storing units thereof, the data for reporting the mode switching from the standard communication mode to the power-saving communication mode. In this case, the server Sv (FIG. 4) executes the operating procedure for generating the RTCP packets (APP packets) in a manner such that a program for execution of this operating procedure is stored in the ROM 44, and the CPU 48 executes this stored program, using the RAM 46 as a work area. Instead of installing the program onto the server Sv, for example, a new circuit for execution of a similar operating procedure may be added to the server Sv.

The communication device T1 that receives from the server Sv the RTCP packets for reporting switching of the communication mode switches a mode from the standard communication mode to the power-saving communication mode (E4) in a manner that the data transmission and reception controlling unit 27 generates and executes the mode switching command. The transmission and reception data controlling unit 27 of the communication device T1 stops transmission of the voiceless data in the form of packets and divides only the voice data into RTP packets, thereby transmitting the packets to the server Sv (E5). Similarly, the server Sv stops transmission of the voiceless data in the form of packets and divides only the voice data into RTP packets, thereby transmitting the packets to the communication device T1.

In this manner, it is possible to reduce a burden not only in the transmission process of transmitting the voice data from the communication device T1 to the server Sv but also in the reception process of receiving the voice data transmitted from the server Sv to the communication device T1. Therefore the battery power consumption of the communication device T1 can be reduced very effectively, thereby efficiently achieving lower power consumption of the communication device T1. As a result, the communication device can be continuously used over a long time. Effects of the lower power consumption are not limited to the communication device T1 at the caller side only. The communication device T2 at the called side can also achieve lower power consumption because the voice data transmitted from the communication device T1 and received by the communication device T2 is limited only to the voice data.

According to this embodiment, the communication mode is switched by the notification of transmission and reception of the RTCP packets (APP packets), so that the communication mode can be readily switched without being affected by a regular data stream (that is, a process sequence of the sound data). In addition, switching of the communication mode for every transmission and reception of the RTCP packets can be controlled, thus allowing the user to more accurately control the communication mode in conformance with the actual communication condition (communication environment).

In this embodiment, after the standard communication mode is mode-switched to the power-saving communication mode, the mode can be switched (restored) to the standard communication mode as required. In this case, prior to switching (restoring) the mode, the data transmission and reception controlling unit 27 of the communication device T1 transmits the RTCP packets for reporting this switching (restoring) of the communication mode to the server Sv through the wireless LAN interface 18 (E6). At that time, the data transmission and reception controlling unit 27 sets the packet type value to 204 as an extension event of the RTCP while generating the RTCP packets (APP packets) having stored in the data storing units thereof, the data for reporting the mode switching from the power-saving communication mode to the standard communication mode.

In the case where the mode of the communication device T1 is switched (restored) to the standard communication mode, upon the receipt of the RTCP packets reporting the communication mode switching (restoring), the server Sv transmits to the communication device T1 the RTCP packets for reporting this switching (restoring) of the communication mode in a similar manner (E7). At that time, the server Sv sets the packet type value to 204 as an extension event of the RTCP while generating the RTCP packets (APP packets) storing in the data storing units thereof, the data for reporting the mode switching (restoring) from the power-saving communication mode to the standard communication mode.

Accordingly, at the time of transmission of the sound data to the server Sv, the communication device T1 resumes transmission of the sound data (voiceless data) below the predetermined level in a manner such that the above data is transmitted together with the sound data (voice data) beyond the predetermined level. Similarly, at the time of transmission of the sound data to the communication device T1, the server Sv resumes transmission of the voiceless data in a manner to transmit the above data together with the voice data.

While, in the above-described embodiment, the sound data beyond the predetermined level is set to the voice data while the sound data below the predetermined level is set to the voiceless data, the present invention is not limited thereto. A level of the voice data may be set based on other criteria. For example, the sound data containing the predetermined amount of the voice data may be set to the sound data beyond the predetermined level, whereas the sound data containing the predetermined amount of the voiceless data may be set to the sound data below the predetermined level.

In this case, there is a need to perform a process of judging whether these criteria are met or not. In the communication devices T1, T2, the data transmission and reception controlling unit 27 described above may execute a judgment process to switch the communication mode based on the judgment result. On the other hand, in the server Sv, the data transmission and reception function described above is additionally provided with the judgment function with which the judgment process is executed and the communication mode is switched based on the judgment result. Alternatively, a judgment unit (not shown) may be built in the server Sv, with which the judgment process is executed and the communication mode may be switched based on the judgment result.

The communication mode between the communication devices T1, T2 and the server Sv may be switched considering criterial factors such as measured data of the radio field intensity retrieved by the radio field intensity measuring unit 20 of the relay devices 1AP, 2AP and positions of the communication devices located based on the above data. For example, when the communication devices T1, T2 are located near the relay devices 1AP, 2AP, according to the measured data of the radio field intensity, the communication mode is switched from the standard communication mode to the power-saving communication mode. On the other hand, when the communication devices T1, T2 are located distantly from the relay devices 1AP, 2AP, the communication mode is switched from the power-saving communication mode to the standard communication mode.

As described above, the communication mode can be switched mutually and freely between the standard communication mode and the power-saving communication mode, so that the standard communication mode or the power-saving communication mode can be arbitrarily selected. Thus, not only the lower power consumption of the communication device T1 can be achieved but also the telephone speech quality can be freely changed according to the communication environment. For example, the communication mode is set to the power-saving communication mode to prevent battery consumption in places in ambient noise-containing environment while being set to the standard communication mode after the user moves to quiet places, so that the communication can be continued with higher telephone speech quality.

Second Embodiment

Figure 5:
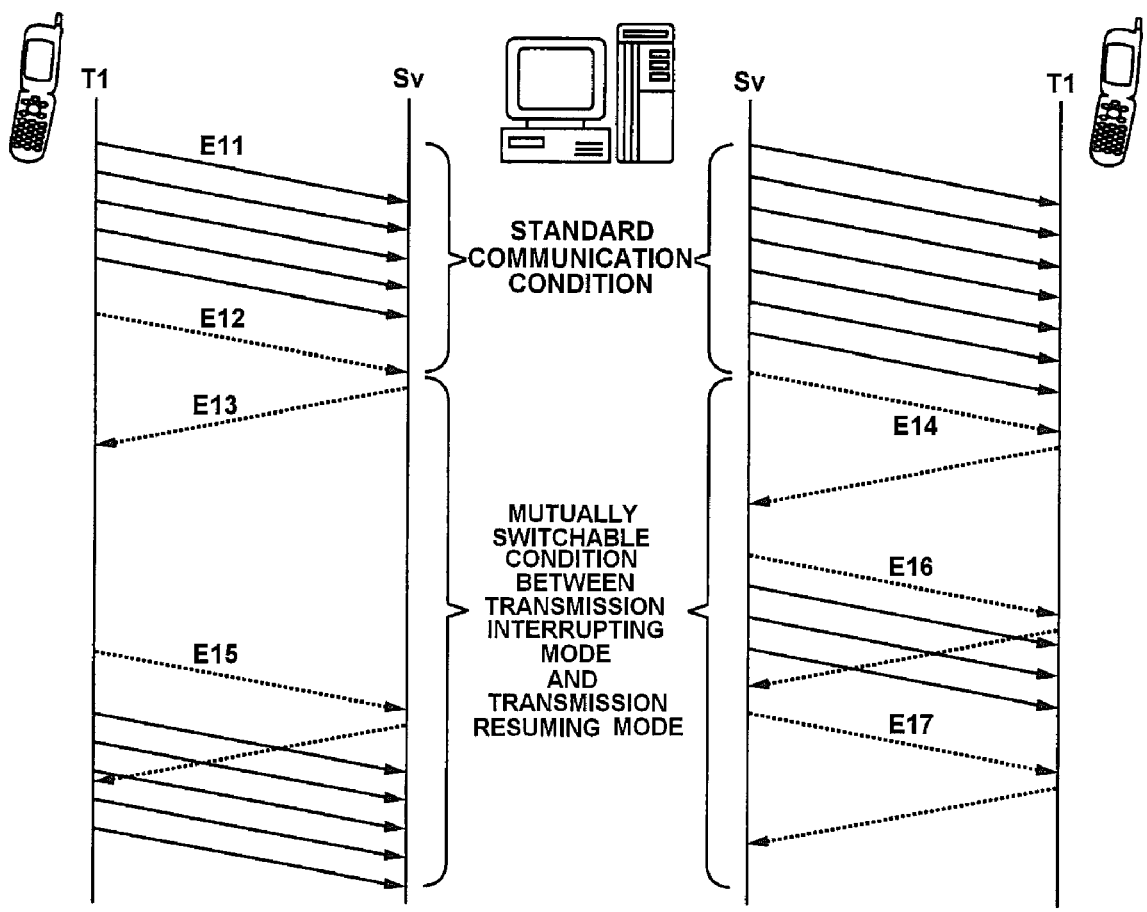
FIG. 5 is a view showing a process sequence of switching a sound-data transmission mode of an IP telephone system according to a second embodiment of the present invention.

Next, the IP telephone system according to a second embodiment will be explained with reference to FIG. 5. It should be noted that the same structure is explained with reference to the drawing used in the above explanation, as required. In the IP telephone system according to the second embodiment, two communication data transmission modes (a transmission interrupting mode and a transmission resuming mode) are arbitrarily switched to transmit and receive the communication data (sound data shown as one example) between the communication devices T1, T2 and the server Sv during the communication between the communication devices T1, T2. That is, the IP telephone system according to this embodiment includes a data transmission and reception controlling unit. The data transmission and reception controlling unit mutually mode-switches between the transmission interrupting mode and the transmission resuming mode upon input of a predetermined command in a condition that communication connection is established between the communication devices T1, T2 after execution of the connection starting process. Between the communication devices T1, T2 and the server Sv, transmission of all communication data is interrupted in the transmission interrupting mode. Further, the interrupted transmission of the communication data is resumed in the transmission resuming mode.

In this case, as shown in FIG. 2, each of the communication devices T1, T2 is provided with a data transmission and reception controlling unit 27 as the data transmission and reception controller. Upon input of a transmission mode switching command, specifically, a command for switching from a condition in which the communication is conducted between the communication devices T1, T2 (hereinafter, referred to as a standard communication condition) to the transmission interrupting mode, the data controlling unit 27 interrupts transmission of the sound data to the server Sv. On the other hand, upon input of a command for switching from the transmission interrupting mode to the transmission resuming mode, the data controlling unit 27 resumes transmission of the sound data to the server Sv, that was interrupted in the transmission interrupting mode.

The server Sv is additionally provided with a data transmission and reception controlling function as the data transmission and reception controller. This function is intended to stop transmission of the sound data to the communication devices T1, T2 upon input from the communication devices T1, T2 of a reporting command reporting that the transmission mode has been switched, specifically, from the standard communication condition to the transmission interrupting mode. On the other hand, the data transmission and reception controlling function allows the server Sv to resume transmission of the sound data to the communication devices T1, T2, which was interrupted in the transmission interrupting mode, upon input of the reporting command reporting that the transmission interrupting mode is mode-switched to the transmission resuming mode.

Next, an exemplary operation of the IP telephone system, of switching the sound data transmission mode, according to the second embodiment, will be described with reference to FIG. 5. This exemplary operation is explained on the assumption that control is exercised between the communication device T1 and the server Sv to switch the sound data transmission mode. This control is exercised in a condition that the communication device T1 is set as the caller side while the communication device T2 is set as the called side when the communication connection (the RTP/RTCP session) is already established upon execution of the connection starting process between the communication devices T1, T2.

After execution of the connection starting process, the communication device T1 adds (stores) the sound data to the RTP packets, thereby transmitting the data to the communication device T2 as the other side of communication (the called side) through the server Sv (E11). This sound data includes the sound data below the predetermined level such as voiceless data generated between conversations or noise data generated around the user (hereinafter, referred to as voiceless data), other than the sound data beyond the predetermined level (hereinafter, refereed to as voice data) exchanged in a daily convention.

In this manner, the communication (conversation) can be conducted between the communication devices T1, T2, that is, the users P1, P2. Typically, the sound data is transmitted and received between the communication devices T1, T2 through the server Sv until the communication (conversation) is terminated. On the other hand, during the conversation between the users P1, P2 (communication between the communication devices T1, T2), an event other than the telephone conversation (such as having a visitor, a meal, or a wash) occurs, and there is a case in which the conversation cannot be continued and must be temporarily interrupted.

In such a case, if the user P1, for example, deals with other situations as described above, with the communication device T1 set in the standard communication condition, the voiceless data is digitalized in the sound processing circuit 12, and then, the digitized data is added to the RTP packets. Further, the resultant data is transmitted to the server Sv in the form of packets during this situation, resulting in wasteful battery power consumption of the communication device T1.

Thus, in the case where a need for interruption of the communication once started arises, as described above, battery power consumption is reduced in this embodiment of the present invention to achieve lower power consumption of the communication device T1 by interrupting transmission of all sound data (voice data and voiceless data) in the form of packets, that is, mode-switching of the communication device T1 from the standard communication condition to the transmission interrupting mode. In this case, the data transmission and reception controlling unit 27 regularly monitors a level of the voice signal (in terms of, e.g., a decibel value, volume, and frequency) that is picked up and output by the microphone 8. In the case where the level decreases below a predetermined level (hereinafter referred to as a standard level), the communication device T1 automatically generates and executes a command (mode switching command) for switching the sound data transmission mode from the standard communication condition to the transmission interrupting mode, thereby interrupting transmission of the sound data (voice data and voiceless data) in the form of packets to the server Sv.

The standard level is not particularly limited, because it may be arbitrarily set depending on the intended use or use environment of the IP telephone system. For example, the standard level may be set as a threshold value for judging an output level status (such as level pitch or output time) of the invalid sound data (voiceless data) that was pick up by the microphone 8. In this case, the standard level may be fixedly preset or may be set by being arbitrarily changed (step by step) in accordance with communication time or the battery remaining amount at the time of the communication.

The data transmission and reception controlling unit 27 may passively (manually) generate and execute the mode switching command, based on explicit operation performed by the user P1 (such as operation of pushing a mode switching button or utterance of keywords (meaningful words), instead of or in addition to the structure with which the data transmission and reception controlling unit 27 automatically generates and executes the mode switching command by regularly monitoring a level of the voice signal (in terms of, e.g., a decibel value, volume, and frequency) that is picked up and output by the microphone 8 and thereby judging whether the output level of the sound data decreases below a threshold value (standard level) and a predetermined time has elapsed or not while the level remains below the threshold value.

With the structure described above, the user P1 can switch the sound data transmission mode from the standard communication condition to the transmission interrupting mode in response to needs therefor. In this manner, the user P1 can view an indicator of the battery remaining amount displayed on a monitor (not particularly assigned with numerals) of the communication device T1. Further, even if the remaining amount is sufficient as well as if the remaining amount decreases, the user generates and executes the mode switching command, and then, switch the sound data transmission mode from the standard communication condition to the power-saving communication mode, with making allowance for the communication time, whereby battery consumption can be reduced more effectively.

In the case where the sound data transmission mode of the communication device T1 has been switched from the standard communication condition to the transmission interrupting mode as described above, the communication device T1 transmits, to the server Sv through the wireless LAN interface 18 (E12), the RTCP packets for reporting the status in which the sound data transmission mode has been switched. At that time, the data transmission and reception controlling unit 27 sets the packet type value to 204 as an extension event of the RTCP while generating the RTCP packets (APP packets) storing the data for reporting in the data storing units thereof, the mode switching from the standard communication condition to the transmission interrupting mode.

Having thus received from the communication device T1, the RTCP packets for reporting the sound data transmission mode switching, the server Sv transmits to the communication device T1, the RTCP packets for reporting the status in which interruption has been accepted upon recognition of mode switching of the communication device T1 to the transmission interrupting mode (that is, recognition of interruption of the sound data transmission), for example, upon detection of the status in which transmission of the sound data from the communication device T1 is interrupted for a predetermined time (E13).

At that time, the server Sv sets the packet type value to 204 as an extension event of the RTCP while generating the RTCP packets (APP packets) storing in the data storing units thereof, the data for reporting acceptance of the mode switching from the standard communication condition to the transmission interrupting mode. In this case, the server Sv (FIG. 4) executes the operating procedure for generating the RTCP packets (APP packets) in a manner such that a program for execution of this operating procedure is stored in the ROM 44 and the CPU 48 executes this stored program using the RAM 46 as a work area. Instead of installing the program onto the server Sv, for example, a circuit for execution of a similar operating procedure may be further constructed in addition to the server Sv.

On the other hand, in the case of failure to recognize interruption of the sound data transmission, the server Sv generates the RTCP packets (APP packets) storing the data reporting sequence numbers of the RTP packets into which the sound data received from the communication device T1 is added (stored), thereby transmitting these packets to the communication device T1. Having thus received these packets, the communication device resumes and continues the communication in a condition where part of the RTP packets is lacking. In this case, the mode can be reliably switched to the transmission interrupting mode with a structure, for example, such that the communication device T1 switches the transmission interrupting mode once more and generates the RTCP packets (APP packets) reporting this status to thereby retransmit these packets to the server Sv. At this point, this system may be structured such that the data transmission and reception controlling unit 27 controls retry operation (that is, determines the number of retires and interval time between retries) of switching to the transmission interrupting mode.

Having thus received from the server Sv, the RTCP packets reporting acceptance of switching of the sound data transmission mode, the communication device T1 interrupts transmission of the packets by stopping dividing all sound data (voice data and voiceless data) into the RTP packets to interrupt transmission of the packets.

Having thus transmitted to the communication device T1 the RTCP packets reporting acceptance of switching of the sound data transmission mode, the server Sv limits the sound data that is to be transmitted to the communication device T1 to the sound data beyond the predetermined level (the voice data), and switches the sound data transmission mode (hereinafter, this mode in the server Sv is also referred to as the transmission interrupting mode) in which transmission of the sound data below the predetermined level (voiceless data) is interrupted. Thus, the server Sv divides only the voice data in the form of the RTP packets, thereby transmitting these packets to the communication device T1.

In this manner, transmission of all sound data (voice data and voiceless data) from the communication device T1 to the server Sv is interrupted. Thus, not only the transmission process of transmitting the sound data but also that of the sound data (voiceless data) from the server Sv to the communication device T1 is interrupted, which reduces the reception process of receiving the transmitted sound data. Therefore, the battery power consumption of the communication device T1 can be reduced extremely effectively, thereby achieving lower power consumption of the communication device T1 efficaciously. As a result, the communication device can be continuously used over a long time. Effects of the lower power consumption are not limited to the communication device T1 at the caller side only. The communication device T2 at the called side can also achieve lower power consumption because transmission of the sound data (voice data and voiceless data) from the communication device T1 to the communication device T2 is interrupted.

With the structure described above, in the case of recognizing the mode switching to the transmission interrupting mode in the communication device T1, the server Sv interrupts transmission of the sound data (voiceless data) below the predetermined level only. A level of sound data as a criterion for determining whether transmission is stopped or not is arbitrarily set when setting the transmission interrupting mode of the server Sv side, depending on the intended use or use environment of the IP telephone system, based on whether meaningful sound has been input or not or whether the sound has about the same level (in terms of, e.g., a decibel value of the sound signal, volume, and frequency) as that of a daily conversation or not. Therefore, the level is not particularly limited herein. Further, this system may be structured such that transmission of all sound data (voice data and voiceless data) is interrupted on the server Sv side in the transmission interrupting mode in a manner similar to that in the communication device T1.

As described above, according to this embodiment, the sound data transmission mode is switched based on the notification of transmission and reception of the RTCP packets (APP packets), so that the sound data transmission mode can be readily switched without being affected by a regular data stream (that is, a process sequence of the sound data). In addition, this system may be structured such that the receiver side (server Sv) having thus received the report judges the necessity for switching of the sound data transmission mode, and for example, may be structured such that the switching of the sound data transmission mode is not permitted (not operated) based on the judgment result. Further, sequence number continuity of the RTP packet can be ensured while the continuity can be readily verified.

Herein, in this embodiment, after switching from the standard communication condition to the transmission interrupting mode, the mode can be switched (restored) from the transmission interrupting mode to the standard communication condition as required. The standard communication condition after switching from the transmission interrupting mode is referred to as a transmission resuming mode.

In the case of switching from the transmission interrupting mode to the transmission resuming mode in the communication device T1, the communication device T1 transmits to the server Sv through the wireless LAN interface 18, the RTCP packets reporting the status that the sound data transmission mode has been switched (restored) (E15). At that time, the data transmission and reception controlling unit 27 sets the packet type value to 204 as an extension event of the RTCP while generating the RTCP packets (APP packets) storing in the data storing units thereof, the data for reporting the mode switching from the transmission interrupting mode to the transmission resuming mode. As a result, the communication device T1 resumes transmission of all sound data (voice data and voiceless data) to the server Sv.

The data transmission and reception controlling unit 27 automatically generates and executes the mode switching (restoring) command by constantly monitoring a level of the voice signal (in terms of, e.g., a decibel value, volume, and frequency) that is pick up and output by the microphone 8 and thereby judging whether the output level of the sound data increases beyond a threshold value (standard level) and a predetermined time has elapsed or not while the sound data remains beyond the threshold value. Instead of or in addition to the structure, the data transmission and reception controlling unit 27 may passively (manually) generate and execute the mode switching command, based on explicit operation performed by the user P1 (such as operation of pushing a mode switching button or utterance of keywords (meaningful words)).

Having thus received from the communication device T1, the RTCP packets for reporting the sound data transmission mode switching, the server Sv transmits to the communication device T1, the RTCP packets for reporting the status that resumption has been accepted upon recognition of mode switching of the communication device T1 to the transmission resuming mode (that is, recognition of resumption of the sound data transmission), for example, upon detection of transmission of the sound data from the communication device T1 for a predetermined time.

At that time, the server Sv sets the packet type value to 204 as an extension event of the RTCP while generating the RTCP packets (APP packets) storing in the data storing units thereof, the data for reporting acceptance of the mode switching from the transmission interrupting mode to the transmission resuming mode. In this case, the server Sv (FIG. 4) executes the operating procedure for generating the RTCP packets (APP packets) in a manner such that a program for execution of this operating procedure is stored in the ROM 44 and the CPU 48 executes this stored program using the RAM 46 as a work area. Instead of installing the program onto the server Sv, for example, a new circuit for execution of a similar operating procedure may be added to the server Sv.

Having thus transmitted to the communication device T1, the RTC packet reporting acceptance of switching of the sound data transmission mode, the server Sv divides into the RTP packets not only the sound data (voice data) beyond the predetermined level but also the sound data (voiceless data) below the predetermined level, thereby resuming transmission of all sound data (voice data and voiceless data) to the communication device T1.

Not only the communication device T1 but also the server Sv can control switching from the standard communication condition to the transmission interrupting mode as well as switching from the transmission interrupting mode to the transmission resuming mode. In this case, the server Sv transmits to the communication device T1, the RTCP packets for reporting that the sound data transmission mode is to be switched (E14, E16, E17).

Specifically, in the case of switching from the standard communication condition to the transmission interrupting mode, the server Sv sets the packet type value to 204 as an extension event of the RTCP while generating the RTCP packets (APP packets) storing in the data storing units thereof, the data for reporting the mode switching from the standard communication condition to the transmission interrupting mode, thereby transmitting the packets to the communication device T1 (E14, E17). On the other hand, in the case of switching from the transmission interrupting mode to the transmission resuming mode, the server Sv sets the packet type value to 204 as an extension event of the RTCP while generating the RTCP packets (APP packets) storing in the data storing units thereof, the data for reporting the mode switching from the transmission interrupting mode to the transmission resuming mode, thereby transmitting the packets to the communication device T1 (E16).

That is, the server Sv can switch on its own initiative from the standard communication condition to the transmission interrupting mode and report the fact to the communication device T1 (E16). In the case where a need for transmission of the sound data (voice data) beyond the predetermined level arises thereafter, that is, in the case of broadcasting in emergency situations, the server Sv switches (restores) the mode from the transmission interrupting mode to the transmission resuming mode and reports this switching (E17). Thus, the mode can be mutually and freely switched between the communication device T1 and the server Sv as needed, between the standard communication condition (transmission resuming mode) and the transmission interrupting mode In the above-described embodiment, the sound data beyond the predetermined level is set to the voice data while the sound data below the predetermined level is set to the voiceless data but the present invention is not limited to this embodiment, so that a level of the voice data may be set based on other criteria. For example, the sound data containing the predetermined amount of the voice data may be set to the sound data beyond the predetermined level while the sound data containing the predetermined amount of the voiceless data may be set to the sound data below the predetermined level.

In this case, the server Sv is required to perform a process of judging whether or not these criteria are fulfilled. The data transmission and reception function described above may be added with the judgment function with which the judgment process is executed and the sound data transmission mode is switched based on the judgment result. Alternatively, a judgment unit (not shown) may be built in the server Sv, with which the judgment process is executed and the sound data transmission mode may be switched based on the judgment result.

The sound data transmission mode between the communication devices T1, T2 and the server Sv may be switched by considering criterial factors, such as measured data of the radio field intensity retrieved by the radio field intensity measuring unit 20 of the relay devices 1AP, 2AP, and positions of the communication devices located based on the above data.

Based on the criteria for switching the mode, as described above, the mode can be switched mutually and freely between the standard communication condition (communication resuming mode) and the transmission interrupting mode, so that the standard communication condition or the transmission interrupting mode can be arbitrarily selected. Thus, not only the lower power consumption of the communication device T1 can be achieved but also the telephone speech quality can be freely changed according to the communication environment. For example, the mode is set to the transmission interrupting mode to prevent battery consumption in places in noisy environment while being set to the standard communication condition (communication resuming mode) after the user moves to quiet places, so that the communication can be continued with higher telephone speech quality.

Third Embodiment

Figure 6:
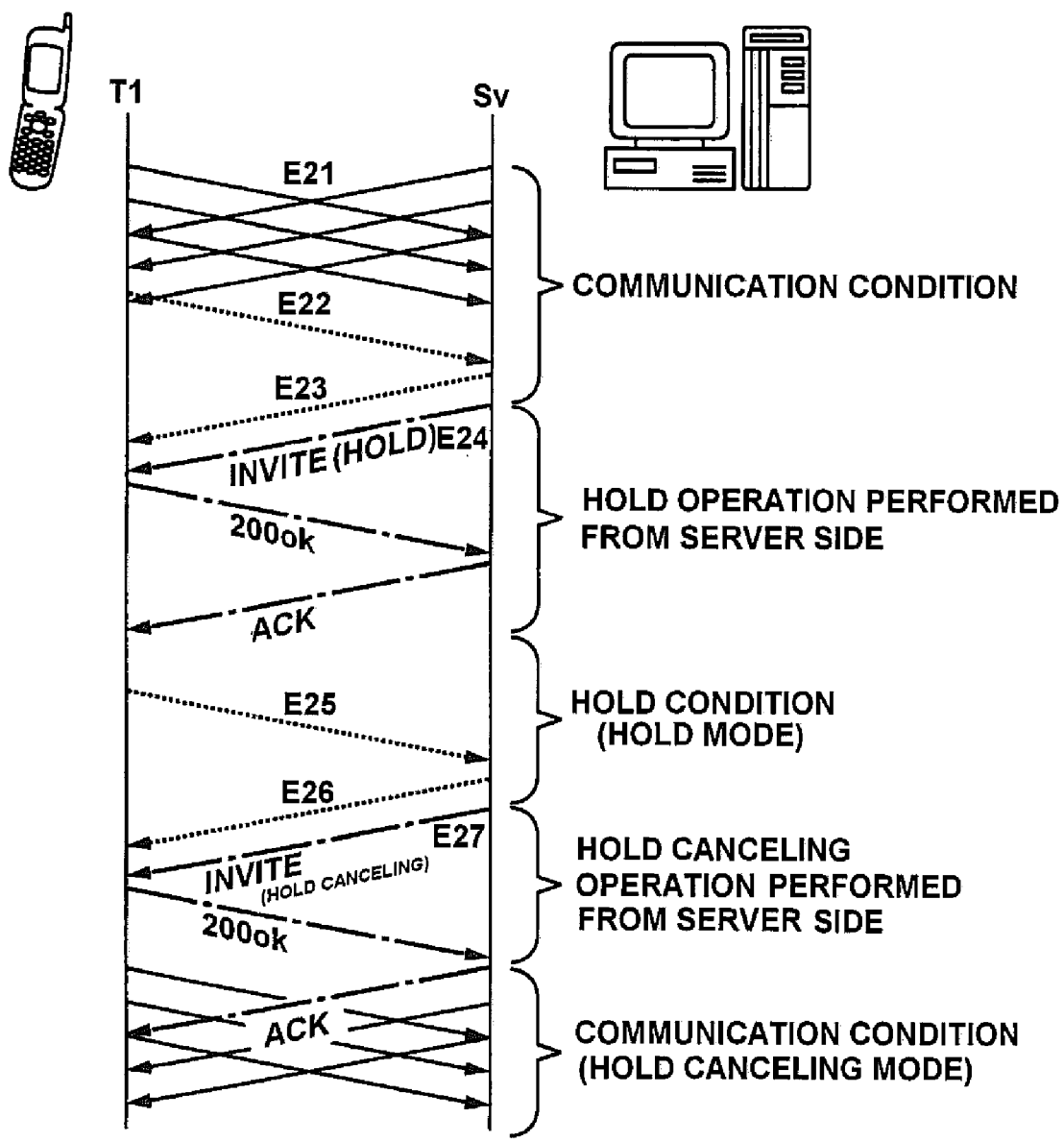
FIG. 6 is a view showing a control process sequence of mode-switching of the IP telephone system between a hold mode and a hold canceling mode, according to the second embodiment of the present invention.

Next, the IP telephone system according to a third embodiment will be explained with reference to FIG. 6. It should be noted that the same structure is explained with reference to the drawing used in the above explanation, as required. In the IP telephone system according to the third embodiment, as shown in FIG. 6, two (telephone conversation) modes (a hold mode and a hold canceling mode) are arbitrarily switched to transmit and receive the communication data between the communication devices T1, T2 and the server Sv during the communication between the communication devices T1, T2. Here, the sound data is provided as one example of the communication data, the sound data being divided into the RTP packets and transmitted and received between the communication devices T1, T2 and the server Sv during the communication between the communication devices T1, T2 (FIG. 1A).

Therefore, the IP telephone system according to this embodiment includes a session controlling unit for mutually switching the mode between the hold mode and the hold canceling mode upon input of a predetermined command in a condition that the session for allowing mutual communication between the communication devices T1, T2 has been established upon execution of the connection starting process. The session is temporarily interrupted by executing a process of controlling the session established between the communication devices T1, T2 and the server Sv in the hold made while the interrupted-session is resumed by canceling the hold mode in the hold canceling mode.

In this case, as shown in FIG. 2, each of the communication devices T1, T2 is provided with a session controlling unit 29 as the session controller. The session controlling unit 29 requests the server Sv to mode-switch the communication condition to the hold mode upon input of a command for switching the two communications modes, specifically, a command for switching from the communication condition to the hold mode. Here, the communication is conducted between the communication devices T1, T2 upon establishment of the session in the aforementioned communication condition while the session is temporarily interrupted in the hold mode. On the other hand, the session controlling unit 29 requests the server Sv to mode-switch the hold mode to the hold canceling mode upon input of a command for switching the hold mode to the hold canceling mode (that is, the communication condition).

The server Sv is additionally provided with a session controlling function as the session controller. This function is intended to switch the communication mode from the communication condition to the hold mode between the communication devices T1, T2 upon execution of a process (SIP sequence process of example) for controlling the established-session upon input of a reporting command from the communication devices T1 T2, indicative of a request for mode-switching the communication condition to the hold mode, specifically. On the other hand, the session controlling function allows the server Sv to execute the process (SIP sequence process) for controlling the established-session upon input of a reporting command indicative of a request for mode-switching the hold mode to the hold canceling mode, thereby switching the communication mode between the communication devices T1, T2 from the hold mode to the hold canceling mode (communication condition).

Next, an exemplary operation of the IP telephone system according to the third embodiment to switch the communication mode will be described with reference to FIG. 6. This operational example is explained on the assumption that control is exercised between the communication device T1 and the server Sv to switch the communication mode. This control is exercised in a condition that one of the communication devices, T2, has an outside line call from a third party when the communication connection (the RTP/RTCP session) has already been established upon execution of the connection starting process between the communication devices T1, T2.

While the session is established between the communication devices T1, T2, the plurality of RTP packets added with (storing) the sound data are transmitted and reconstructed to the other side of communication through the server Sv and the relay devices 1AP, 2AP, thereby continuing the communication condition (E21). The sound data includes the sound data below the predetermined level such as voiceless data generated between conversations or noise data generated around the user (hereinafter referred to as voiceless data), other than the sound data beyond the predetermined level (hereinafter, refereed to as voice data) exchanged during a daily convention.

In the above communication condition, when one of the communication devices, T2, has an outside line call from a third party, the calling (communication) condition between the other communication device T1 and one of the communication devices, T2, is canceled while the communication with the server Sv is only allowed. At this time, the user P1 of the communication device T1 does not make communication (telephone conversation) with the calling party of the communication device T2 but the microphone 8 (FIG. 2) of the communication device T1 keeps picking up various types of data on voice uttered by someone other than the user P1 or sound data mixed with other voiceless data. The communication device T1 digitizes the picked-up useless sound data (voice data and voiceless data) in the sound processing circuit 12 (FIG. 2) and added the data to the RTP packets, thereby transmitting the data in the form of packets to the server Sv. However, this transmission process results in wasteful battery power consumption of the communication device T1.

In the circumstances as described above, the IP telephone system reduces power consumption of the battery to achieve lower power consumption of the communication device T1 by stopping the communication device T1's transmission of the useless sound data (voice data and voiceless data) in the form of packets as described above, that is, by switching a mode of the communication device T1 from the communication condition to the hold mode at the time when the condition as described above occurs. In the communication device T1, the session controlling unit 29 constantly monitors a level (output level in terms of, e.g., a decibel value, volume, or frequency) of all the sound data picked-up by the microphone 8. In the case where the level decreases below the standard level, a signal indicative of that status is input as a command for switching the communication mode into the session controlling unit 29. At this time, the session controlling unit 29 generates the reporting command requesting the mode switching with which the communication mode is switched from the communication condition to the hold mode.

Here, the standard level can be arbitrarily set depending on the intended use or use environment of the IP telephone system, thereby being not particularly limited. For example, the standard level may be set as a threshold value for judging an output level status (such as level pitch or output time) of the useless sound data that was picked up by the microphone 8. In this case, the session controlling unit 29 judges that the picked-up sound data is invalid when the output level of the sound data, which was picked up by the microphone 8, decreases below the threshold value (standard level) and a predetermined time has elapsed while the level remains below the threshold value, thereby automatically generating the reporting command requesting the mode switching. The standard level may be fixedly set in advance based on the sound data which can be picked up with the microphone 8, or may be set by being arbitrarily changed (step by step) in accordance with communication time or the battery remaining amount at the time.

The session controlling unit 29 may passively generate the reporting command, based on explicit operation performed by the user P1 (such as operation of pushing a mode switching button or utterance of keywords (meaningful words), instead of or in addition to the structure that the session controlling unit 29 automatically generates the reporting command by regularly monitoring the level of the sound data picked-up by the microphone 8. In this manner, the reporting command can be generated depending on the needs of the user P1, the command requesting the mode switching to switch the communication mode to the hold mode. With the structure, the user P1 can view the indicator of the battery remaining amount displayed on the monitor (not particularly assigned with numerals) of the communication device T1. Even if the remaining amount is sufficient as well as if the remaining amount decreases, the reporting command can be generated with making allowance for the communication time.

The reporting command generated with the session controlling unit 29 is transmitted in the form of the RTCP packets from the communication device T1 to the server Sv through the wireless LAN interface 18 (E22). At that time, the session controlling unit 29 sets the packet type value to 204 as an extension event of the RTCP while generating the RTCP packets (APP packets) having stored the aforementioned report command in the data storing units thereof.

Having thus received the above reporting command, the server Sv transmits, using the session controlling function, the RTCP packets to report acceptance of the mode switching request (E23). At that time, the server Sv sets the packet type value to 204 as an extension event of the RTCP while generating the RTCP packets (APP packets) having stored the reporting command in the data storing units thereof. In this case, the server Sv (FIG. 4) executes the operating procedure for generating the RTCP packets (APP packets) in a manner such that a program for execution of this operating procedure is stored in the ROM 44 and the CPU 48 executes this stored program, using the RAM 46 as a work area. Instead of installing the program onto the server Sv, for example, a circuit for execution of a similar operating procedure may be further added to the server Sv.

Subsequently, the server Sv executes, using its own session controlling function, a process (SIP sequence process) for controlling the established-session to switch the communication mode with the communication devices T1, T2, from the communication condition to the hold mode. In this case, in the SIP sequence process, the server Sv executes the hold operation toward the communication device T1 (E24). That is, when transmitting a signal "INVITE (HOLD)" to the communication device T1 and subsequently receiving a signal "200ok (successful reply)" from the communication device T1, the server Sv transmits a signal "ACK (acknowledge reply)" to the communication device T1. In this manner, the communication device T1 is maintained in the hold condition.

The above structure eliminates not only the transmission process of the communication device T1 to transmit the invalid sound data below the standard level to the server Sv but also the reception process to receive the sound data transmitted from the server Sv. Therefore, to the extent that processes are eliminated, the battery power consumption of the communication device T1 can be reduced while lower power consumption of the communication device can be achieved. As a result, the communication device T1 can be continuously used over a long time.

Furthermore, in this embodiment, the reporting command is transmitted to the server Sv in the form of RTCP packets (APP packets), the command requesting the mode switching to switch the communication mode from the communication condition to the hold mode. This enables the communication mode to be readily switched without being affected by the regular data stream (that is, a process sequence of the sound data). In addition, switching of the communication mode for every transmission and reception of the RTCP packets is controlled, thereby more accurately controlling the communication mode in conformance with the actual communication condition (communication environment).

In this embodiment, after the communication mode is switched from the communication condition to the hold mode, the communication device T1 switches the hold mode to the hold canceling mode depending to the needs by the user P1 of the communication device T1, so that the communication mode can be restored to the communication condition in which the communication devices T1, T2 can communicate with each other. Here, a method of restoring the mode into the communication condition executes a judgment process of judging whether a level (output level in terms of, e.g., a decibel value, volume, and frequency) of the first voice (sound data) that the user P1 utters to the microphone 8 (FIG. 2) of the communication device T1 is beyond or below the aforementioned standard level (threshold value). This judgment process is executed by the session controlling unit 29. Upon judging that the level is beyond the standard level, the session controlling unit 29 judges that the picked-up sound data is valid (meaningful communication/conversation). Based on this judgment result, the reporting command requesting the mode switching is automatically generated to switch the communication mode from the hold mode to the hold canceling mode.

Upon judging that the level is below the standard level, the session controlling unit 29 judges that the picked-up sound data is invalid, and the communication device T1 is maintained in the hold condition. By a method for restoring the communication device T1 into the communication condition, instead of or in addition to the structure that the session controlling unit 29 automatically generates the reporting command, the session controlling unit 29 may passively generate the reporting command, based on explicit operation performed by the user P1 (such as operation of pushing a mode switching button or utterance of keywords (meaningful words)).

The reporting command (the mode switching requesting command for restoring the mode into the communication condition) generated with the session controlling unit 29 is transmitted in the form of the RTCP packets from the communication device T1 to the server Sv through the wireless LAN interface 18 (E25). At that time, the session controlling unit 29 sets the packet type value to 204 as an extension event of the RTCP while generating the RTCP packets (APP packets) storing the reporting command in the data storing units thereof.

Having thus received the above reporting command, the server transmits, using the session controlling function, the RTCP packets to the communication device T1 to report acceptance of the mode switching request (E26). At this point, the server Sv sets the packet type value to 204 as an extension event of the RTCP while generating the RTCP packets (APP packets) storing the reporting command in the data storing units thereof. In this case, the server Sv (FIG. 4) executes the operating procedure for generating the RTCP packets (APP packets) in a manner such that a program for execution of this operating procedure is stored in the ROM 44 and the CPU 48 executes this stored program, using the RAM 46 as a work area. Instead of installing the program onto the server Sv, for example, a circuit for execution of a similar operating procedure may be further added to the server Sv.

Subsequently, using its own session controlling function, the server Sv executes a process (SIP sequence process) for controlling the established-session to switch the communication mode with the communication devices T1, T2 from the hold mode to the hold canceling mode. In this case, in the SIP sequence process, the server Sv executes the hold canceling operation toward the communication device T1 (E27). That is, when transmitting "INVITE (HOLD CANCEL)" to the communication device T1, and subsequently, receiving "200ok (successful reply)" from the communication device T1, the server Sv transmits "ACK (acknowledge reply)" to the communication device T1. In this manner, the communication device T1 is restored to, and then, is maintained in, the communication condition (hold canceling mode).

While, in the above-described embodiment, the sound data beyond the predetermined level is set to the voice data while the sound data below the predetermined level is set to the voiceless data, the present invention is not limited thereto. A level of the voice data may be set based on other criteria. For example, the sound data containing the predetermined amount of the voice data may be set to the sound data beyond the predetermined level, whereas the sound data containing the predetermined amount of the voiceless data may be set to the sound data below the predetermined level.

This case requires a process of judging whether or not these criteria are fulfilled. In the communication devices T1, T2, the data transmission and reception controlling unit 27 described above may execute a judgment process to switch the communication mode based on the judgment result. On the other hand, in the server Sv, the data transmission and reception function described above is added with the judgment function with which the judgment process is executed and the communication mode is switched based on the judgment result. Alternatively, a judgment unit (not shown) may be built in the server Sv, with which the judgment process is executed and the communication mode may be switched based on the judgment result.

The communication mode between the communication devices T1, T2 and the server Sv may be switched considering criterial factors such as measured data of the radio field intensity retrieved by the radio field intensity measuring unit 20 of the relay devices 1AP, 2AP and conditions of the communication devices T1, T2 identified based on the above data.

Based on the criteria for switching as described above, the current mode can be switched mutually and freely between the hold mode and the hold canceling mode, so that the hold mode or the hold canceling mode can be arbitrarily selected. Thus, not only the lower power consumption of the communication device T1 can be achieved but also the telephone speech quality can be freely changed according to the communication environment. For example, when the users P1, P2 occasionally enter the situation other than the telephone conversation (such as having a visitor, a meal, or a wash) and cannot continue the conversation, the current mode is temporarily switched to the hold mode to prevent battery consumption, thereby making it possible to achieve lower power consumption of the communication device T1. As a result, the communication device T1 can be continuously used over a long time.

Furthermore, according to this embodiment, the session between the communication device T1, T2 outside the communication area can be prevented from being uncontrollable, because the hold operation and hold canceling operation to the communication devices T1, T2 are performed on the server Sv side. At the same time, the hold controlling operation can be performed for various types of communication terminals not provided with the session controlling unit. In this manner, lower power consumption of any communication terminals can be achieved regardless of types of the communication terminals.

What is claimed is:
1. An IP telephone system, comprising:
(i) a plurality of communication devices allowed to mutually communicate through a network;
(ii) a server for executing a connection starting process of communication between the communication devices, as well as for controlling sound data transmitted and received between the server and the communication devices during the communication between the communication devices; and
(iii) a data transmission and reception controller for mutually switching, upon input of a predetermined command, communication mode between a standard communication mode and a power-saving communication mode in a condition that communication connection is estab- lished between the communication devices upon execution of the connection starting process, wherein:

the sound data is transmitted and received between the communication devices and the server in the standard communication mode; and transmission and reception between the communication devices and the server is stopped with respect to the sound data below a predetermined level while being continued with respect to the sound data beyond the predetermined level in the power saving communication mode.

2. The IP telephone system according to claim 1, wherein:

each of the communication devices is provided with a data transmission and reception controlling unit as the data transmission and reception controller, which stops transmission of the sound data below the predetermined level to the server while continuing the transmission of the sound data beyond the predetermined level, upon input of a command for switching the communication mode; and the server is additionally provided with a data transmission and reception controlling function as the data transmission and reception controller, which stops transmission of the sound data below the predetermined level to the communication devices while continuing the transmission of the sound data beyond the predetermined level, upon input of a reporting command for reporting a status that the communication mode of the communication devices is to be switched.

3. The IP telephone system according to claim 2, wherein:

the sound data is transmitted and received between the communication devices and the server based on an RTP; and the reporting command is transmitted as an extension event of an RTCP from the communication devices to the server.

* * * * *